(12) United States Patent
Lange et al.

(10) Patent No.: US 7,533,471 B2
(45) Date of Patent: May 19, 2009

(54) APPARATUS AND METHOD FOR TESTING THREADS

(75) Inventors: Dirk Lange, Lüneburg (DE); Ulrich Mohr, Kassel (DE)

(73) Assignee: ARTIS Gesellschaft fur angewandte Messtechnik mbh, Bispingen-Behringen (DE)

( * ) Notice: Subject to any disclaimer, the term of this patent is extended or adjusted under 35 U.S.C. 154(b) by 23 days.

(21) Appl. No.: 11/829,234

(22) Filed: Jul. 27, 2007

(65) Prior Publication Data

US 2008/0028623 A1 Feb. 7, 2008

(30) Foreign Application Priority Data

Jul. 27, 2006 (DE) .................... 10 2006 034 823

(51) Int. Cl.
*G01B 5/14* (2006.01)
(52) U.S. Cl. ..................... 33/199 R; 33/542
(58) Field of Classification Search .............. 33/199 R, 33/199 B, 629, 542
See application file for complete search history.

(56) References Cited

U.S. PATENT DOCUMENTS

| | | | |
|---|---|---|---|
| 2,513,460 A | 7/1950 | Dorner | |
| 2,536,225 A | 1/1951 | Rice | |
| 4,202,109 A * | 5/1980 | Schasteen | 33/199 R |
| 4,335,518 A * | 6/1982 | Reef | 33/199 R |
| 4,926,700 A | 5/1990 | Peplinski | |
| 5,170,306 A * | 12/1992 | Gomes | 33/199 R |
| 7,059,055 B2 * | 6/2006 | Wickham et al. | 33/199 R |
| 2006/0005405 A1 * | 1/2006 | Wickham et al. | 33/199 R |
| 2006/0085092 A1 | 4/2006 | Redecker et al. | |

FOREIGN PATENT DOCUMENTS

| | | |
|---|---|---|
| DE | 1623212 | 5/1951 |
| DE | 906 398 | 3/1954 |
| DE | 1 477 399 | 7/1969 |
| DE | 35 34 115 | 4/1987 |
| DE | 4017376 | 12/1991 |
| DE | 102004051145 | 4/2006 |
| EP | 0 675 337 | 10/1995 |
| GB | 530 891 | 12/1940 |

OTHER PUBLICATIONS

H. Kamp et al.; "Flexibles rechnergesteurtes Messgeräzum Prüfen von Innengewinden," Technishces Messen tm, vol. 52, issue Dec. 1985; pp. 465-470. (Abstract).
European Search Report for corresponding Application No. EP 07 01 4581.

* cited by examiner

*Primary Examiner*—G. Bradley Bennett
(74) *Attorney, Agent, or Firm*—Renner, Otto, Boisselle & Sklar, LLP

(57) ABSTRACT

The invention relates to an apparatus (10) for testing threads comprising a thread plug gauge (11) which can be screwed into a thread (2) tapped by a machine tool, and a connecting member (14) with which the apparatus (10) can be exchangeably arranged at a tool spindle (20) of the tool machine, and wherein a sliding clutch (12) is arranged between the thread plug gauge (11) and the connecting member (14). The invention relates furthermore to a method in which signals (100) from one or more signals transmitters which are related to screwing-in the thread plug gauge are acquired, in which a reference curve (210) of signals related to screwing the thread plug gauge into a reference thread is stored, and in which the reference curve (210) and/or a curve or magnitude derived therefrom is compared with the signals (100) and/or a curve or magnitude derived therefrom.

20 Claims, 3 Drawing Sheets

Figure 1:
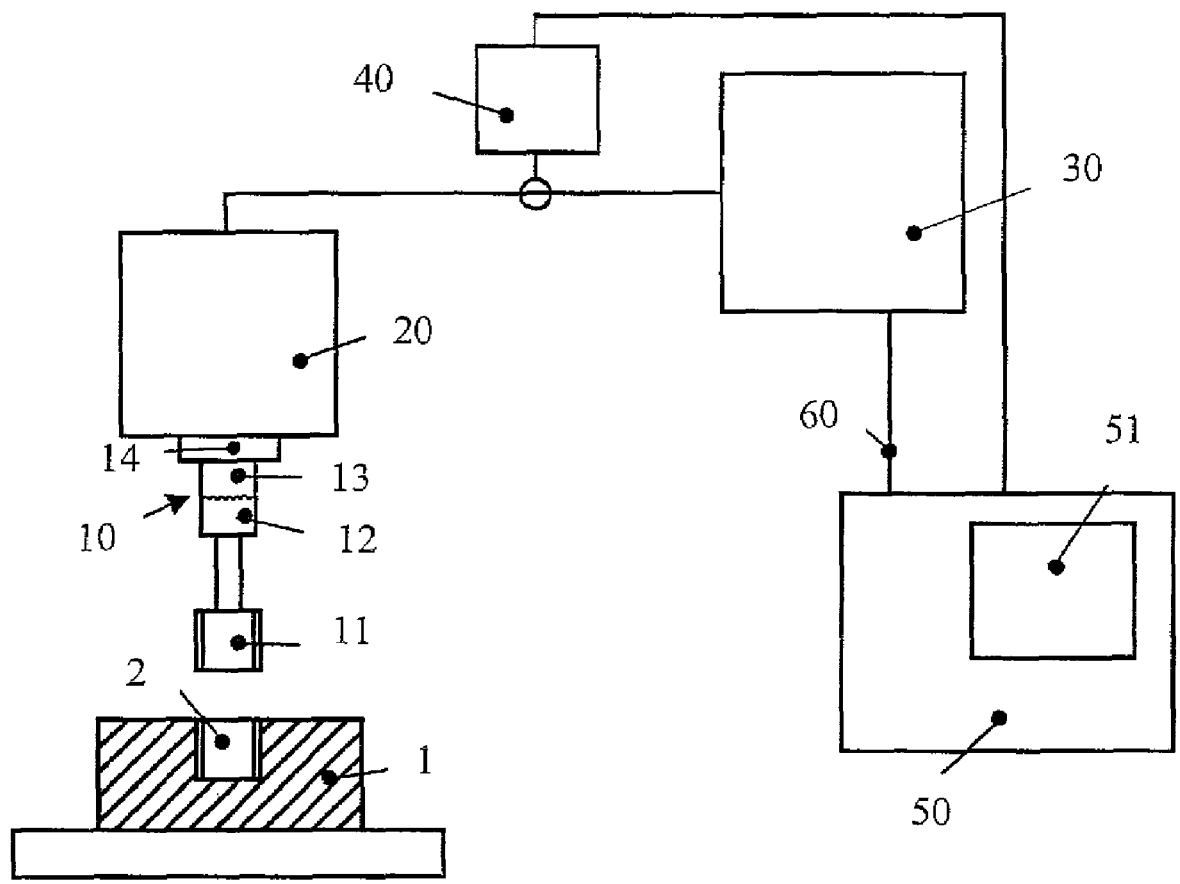

ND FOR TESTING
APPARATUS AND METHOD FOR TESTING THREADS

1. TECHNICAL FIELD

The present invention relates to a method for testing threads in a machine tool and related methods.

2. THE PRIOR ART

Great demands are made on the profitability and productivity of factories. On the other hand, there are also great demands on the quality of the manufactured work pieces. These contradictory targets can frequently only be achieved by a high degree of automation.

The measurement of quality parameters is mostly performed with downstream measurement systems. In doing so, the component is transferred out of the machine and automatically introduced into a measurement cell, or all samples are delivered manually to the measuring equipment. Also known are approaches wherein diameter and geometry are directly measured in the machine using inductive sensors. Another approach is the measurement of process parameters which directly correlate with the machining process. In some cases it is possible to deduce the quality of the work piece from these indirect measurement parameters. For example, from the monitoring of a minimum torque it can be concluded that a bore hole is present. However, in many cases it is not possible to derive a direct quality parameter of the component from the process signals.

In principle, the testing of the quality of inner threads according to DIN 13 part 18 is executed as follows: The thread plug gauge shall be screwed in by hand into the whole length of the thread without applying a particular force. If this is it not possible then the thread does not fulfill the requirements. The thread plug gauge not-go must not be screwed into the thread from both sides more than two turns without applying a particular force. If it can be screwed in more than two turns then the thread does not fulfill the requirements.

An automation of this method is already described in the published patent application DE 1 623 212. In this method, a waste signal is generated when a value exceeds a threshold during screwing-in of a thread plug gauge go by a machine, or when it falls below a threshold during screwing-in of a thread plug gauge not-go. These thresholds should be determined according to the respective requirements, however, it remains open how this determination is to be done.

A further automatization of the testing of threads is known from a paper of Kampa, Kring and Edel "Flexibles, rechnergestütztes Messgerät zum Prüfen von Innengewinden" in "Technisches Messen" 52, p. 465-470. Accordingly, a thread plug gauge is supported so that it has a limited movement in its position and its angular position with respect to a housing. Therefore, the thread plug gauge can adjust to the position and orientation of the thread of the workpiece to be tested. In this way, the forces exerted on the thread plug gauge vertical to the axis of the thread are kept small. The thread plug gauge is driven by a motor via a cardan transmission. Function, position, position of the axis, and depth of the thread of the work piece are measured. In order to test the proper function, the torque progression is determined during screwing-in.

Also in this case it remains open according to which criteria a judgment is made whether the thread is "good" or "bad". Only examples for corresponding torque progressions are given. In addition, in this method the testing of the thread is performed in a downstream testing equipment, as already mentioned-above, wherein the positioning of the thread plug gauge is apparently particularly difficult. Such testing equipments are often positioned by using a roboter, as for example described in DE 40 17 376 A1, so that the testing equipment can be introduced into the thread to be tested by axial feed.

As an alternative to this method, patent DE 906 398 describes a machine tool for several stages such as drilling, thread cutting or thread testing. Here the motor spindle of the machine tool has two ends. At one end, it carries a drill chuck and is directly connected with the motor. The other end of the spindle is connected to the motor via a transmission and a clutch and can hold a thread cutter or a thread plug gauge. During processing of the thread it is required that one side of the tool spindle is rotated by 180 degrees after drilling the hole, in order to subsequently tap and test the thread with the other side. In summary, this known arrangement leads to eminent constructive efforts and related costs.

The present invention is therefore based on the problem to provide a simple and cost effectively applicable apparatus and methods in order to perform thread testing inside the workspace of a machine tool which had processed the work piece before, and wherein more reliable criteria are provided for the judgment of the quality of the thread than known from the prior art.

3. SUMMARY OF THE INVENTION

According to a first aspect of the invention, this problem is solved by an apparatus for testing threads which comprises a thread plug gauge which can be screwed into a thread tapped by a machine tool, a connecting member by which the apparatus can be arranged in a tool spindle of the machine tool, and wherein a sliding clutch is arranged between the thread plug gauge and the connecting member.

Other than the systems explained above known from the prior art for testing threads this apparatus enables the testing of a thread in the same machine tool in which the thread was manufactured before by arranging the apparatus at the tool spindle of the machine tool. Neither a particular machine tool with a double sided spindle which in addition has to be turned nor a further testing machine is necessary. Moreover, the high effort for positioning the thread plug gauge over the thread is no more necessary which is required by testing machines known from the prior art.

In particular the arrangement of a sliding clutch in the apparatus makes it possible that the apparatus can be introduced into the same machine tool which can be used to drill the thread hole. The drilling of a hole is done initially without sliding clutch. The sliding clutch needed for the subsequent thread testing is afterwards introduced into the tool spindle together with the apparatus. According to a further embodiment, the sliding clutch can also be arranged outside the apparatus.

Preferably, the thread plug gauge comprises the form of a thread cutter and is coated such that it can be tightly screwed into a properly tapped thread.

Due to this design of the thread plug gauge it is not necessary to test the quality of the thread by applying a thread plug gauge go and a thread plug gauge not-go, as described in the prior art. Rather, the quality of the thread to be tested can be determined only by characteristics of screwing-in the thread plug gauge, as described in the following.

To this end, the apparatus comprises preferably a measuring system with means for acquisition and evaluation of signals from at least one signal transmitter, wherein the signals are related to screwing-in the thread plug gauge. The signals may comprise at least one of the physical magnitudes current, effective power, torque and/or a path signal. The signal transmitter can be the machine tool itself.

In this way, the signals required for quality testing are provided in a particular simple way, namely by accessing the already present signals of the machine tool. Therefore, the measuring system can be restricted to the acquisition and evaluation of the signals.

Further, the measuring system comprises preferably means for storing a reference curve (or target curve) of signals which are related to screwing the thread plug gauge into a reference thread (or target thread). Other than in the prior art which refers to the adjustment of thresholds, the use of a reference curve of a reference thread provides a complex reference with a plurality of features which can be used to judge the quality of the thread to be tested.

According to a further aspect, the problem of the invention is solved by a method in which a thread plug gauge is arranged in a machine tool in exchange for a tool, in which the thread plug gauge is screwed into a thread previously tapped by the machine tool, and wherein signals which are related to the screwing-in of the thread plug gauge are acquired and evaluated.

According to a further aspect, the problem of the invention is solved by a method in which signals from one or more signal transmitters related to screwing-in the thread plug gauge are acquired, in which a reference curve of signals related to screwing into a reference thread is stored, and in which the reference curve and/or a curve or magnitude derived from the reference curve are compared with the signals and/or a curve or magnitude derived from the signals.

Further embodiments of the invention can be found in further dependent claims.

4. SHORT DESCRIPTION OF THE DRAWINGS

Figure 2:
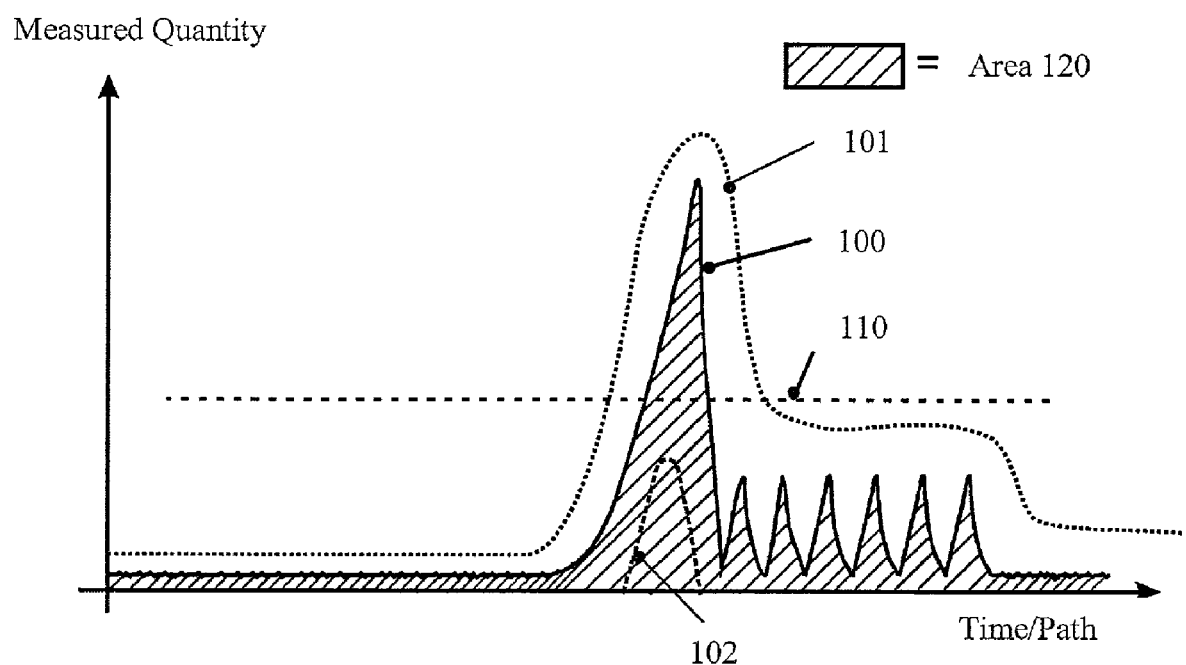
Figure 3A:
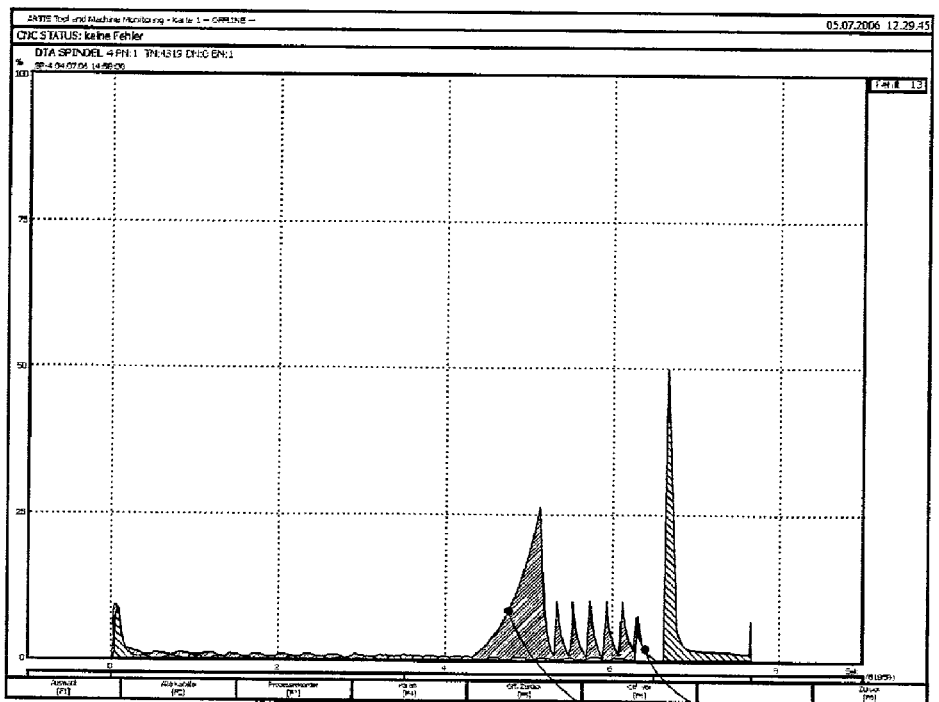
Figure 3B:
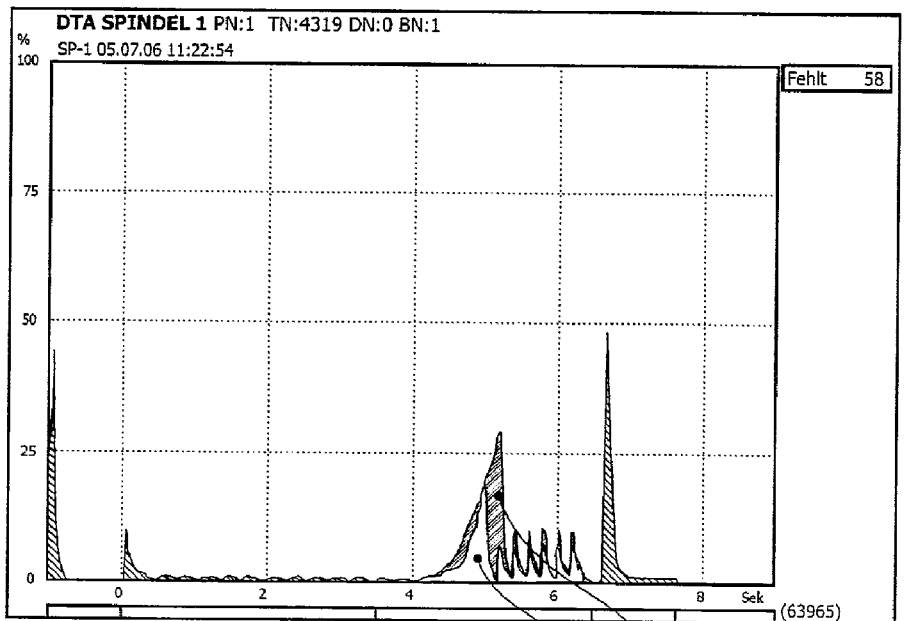

In the following aspects of the present invention are explained with reference to the accompanying drawings:

FIG. 1: A schematic representation of the total system of an embodiment of the present invention;

FIG. 2: a schematic representation of a signal progression during thread testing; and FIG. 3a, 3b: examples of signals during thread testing.

5. DETAILED DESCRIPTION OF PREFERRED EMBODIMENTS

In the following, presently preferred embodiments of the apparatus and methods for thread testing according to the invention are explained in more detail. These are described in connection with a machine tool with tool spindle. An application in other tools is, however, also possible.

FIG. 1 shows a schematic representation of the total system of an embodiment of the present invention. In the figure, a work piece 1 with a thread 2 to be tested in a workspace of the machine tool (not represented) can be recognized. The tool holder 10 with thread plug gauge 11, sliding clutch 12, length compensation 13 and connecting member 14 is arranged at the tool spindle 20 of the machine tool.

The thread plug gauge 11 is constructed such that it can be tightly screwed into a thread which fulfills the quality requirements. In a preferred embodiment the thread plug gauge 11 is coated such that it is protected against abrasion. The length compensation 13 secures that the thread of the thread plug gauge 11 extends into the manufactured thread 2. Furthermore, the length compensation contributes to minimization of feed forces. The connecting member 14 of the tool holder 10 is formed as a standard tool interface so that the tool holder 10 can preferably be used in an arbitrary machine tool.

Since the tool holder 10 itself comprises a sliding clutch 12 it can be directly applied in a machine tool which was used to tap the thread hole. By subsequently using the tool holder 10 the same machine tool can without any changes also be used to test the quality of the tapped thread. In a further embodiment of the invention the sliding clutch 12 is not arranged in the tool holder but in the machine tool.

The machine tool is controlled by a NC control 30. The control signals of the NC control 30 are acquired via a bus 60 by the measuring system 50 and are evaluated in the evaluation unit 51. The acquired signals comprise physical magnitudes such as current, effective power and/or torque of the tool spindle 20. However, other control values or measuring values are conceivable. For example, the NC control 30 or a path sensor may supply a path signal. Additionally or alternatively the measuring system 50 may receive signals from a measuring device 40 for effective power or from other measuring transducers. In particular the tool holder 10 may be equipped with a sensor system similar to that described in DE 10 2004 051 145 A1.

The transmission of the acquired signals to the measuring system 50 can be wired, for example via a bus or an analog interface, or wireless. Additionally, the signals can be modified, processed and/or stored in further devices before they are acquired by the measuring system 50.

After the manufacture of the thread 2 in the work piece 1 the tool holder 10 is exchanged for the thread tool in the tool spindle 20 of the tool machine. After this, the tool machine is activated in order to start the testing process, for example under the control of a NC program for thread processing. The control could also be exerted by the measuring system 50. The tool holder 10 is rotated and driven towards the work piece 1 such that the thread plug gauge 11 can enter the thread 2. If the thread 2 is too small and the thread plug gauge 11 can not enter the thread 2 the torque gets too high and the sliding clutch 12 slips.

Due to the start of the NC program the measuring system 50 receives a starting signal. In the following the signals of the NC control and/or other devices, as described above, are acquired by the measuring system 50.

Preferably, the signals are acquired during screwing of the thread plug gauge 11 into the thread 2. However, additional signals can also be acquired before or after screwing of the thread plug gauge 11 into the thread 2.

FIG. 2 shows a schematic representation of a progression of a signal 100 during thread testing. In this a measured quantity, for example current, effective power, or torque is plotted against path or time.

Furthermore, at least one reference curve (or target curve) of signals is stored in the evaluation unit 51 of the measuring system 50 which is related to screwing-in a reference thread (or target thread) which complies with the quality requirements. As described above, reference curves for current, effective power, or torque can be stored, for example. Preferably, further curves or magnitudes are derived from the reference curves, in order to compare them with the actual signals of the thread 2 to be tested and to derive from this a decision whether the thread 2 complies with the quality requirements. If that is not the case it is to be assumed that the tapped thread 2 is too small or too large or that single turns of the thread are erroneous so that the load-carrying capacity is no more provided. In this case, an alarm is transmitted to the tool machine which leads to an outward transfer or a manual check of the defective component.

In general, for judgment of the quality of the thread the reference curves and/or curves or magnitudes derived therefrom are compared with the actual signals and/or curves or magnitudes derived therefrom. For example, a reference curve can be compared with a curve derived from the actual signals, or a magnitude derived from a reference curve can be compared with the actual signals. All combinations are possible and preferred examples are described in the following.

Curves and magnitudes derived from a reference curve of a reference thread comprise envelopes. By monitoring envelopes the evaluation unit 51 may recognize a defective thread 2. Preferably, a too small thread 2 is recognized if the actual signal exceeds an upper envelope 101. Similarly, a too large thread 2 is recognized if the actual signal falls below a lower envelope 102. Both envelopes in FIG. 2 are shown exemplarily.

Further, the actual signal of the thread 2 to be tested can be compared with a threshold 110 which is also represented in FIG. 2. If the actual signal remains below the threshold the evaluation unit 51 generates an alarm. Preferably, the threshold 110 is derived from a reference curve.

It is also preferred to calculate the area 120 below the curve of the actual signals 100. If this area is smaller than an area threshold then the evaluation unit 51 generates an alarm. The area threshold can be the area under the reference curve.

It is further possible that characteristics such as envelopes, thresholds and area thresholds are combined when judging the quality of a thread.

Preferably envelopes, thresholds, and area thresholds are calculated automatically and represented graphically. To this end, reference curves of one or more reference threads can be used.

FIG. 3 shows examples of a comparison of the signal 100 with reference curves 210 in which a measured quantity is plotted against time. It can be recognized in FIG. 3*a* that a notable force arises only at the end of screwing in the thread plug gauge 11. From this it can be derived that the thread to be tested is too large. By contrast, the force applied to the thread to be tested in FIG. 3*b* shows a curve 100 similar to the curve of the reference thread 210. This allows the conclusion that the thread to be tested is neither too large nor to small.

The invention claimed is:

1. Apparatus for testing threads (10), comprising:
   a. a thread plug gauge (11) which can be screwed into a thread (2) tapped by a machine tool;
   b. a connecting member (14) which can be used to exchangeably arrange the apparatus (10) at a tool spindle (20) of the tool machine; and
   c. a sliding clutch (12) which is arranged between the thread plug gauge (11) and the connecting member (14).

2. Apparatus according to claim 1, wherein the thread plug gauge (11) comprises the form of a thread cutter and is coated such that it can be tightly screwed into a properly tapped thread.

3. Apparatus according claim 1, furthermore comprising a measuring system 50, wherein the measuring system comprises means for acquisition and evaluation (51) of signals (100) from at least one signal transmitter, and wherein the signals are related to screwing in the thread plug gauge (11).

4. Apparatus according to claim 3, wherein the signal transmitter comprises the machine tool.

5. Apparatus according to claim 3, wherein the signals (100) comprise at least one of the physical magnitudes current, effective power, torque and/or a path signal.

6. Apparatus according to claim 3, wherein the measuring system (50) furthermore comprises means for storing a reference curve (210) of signals which are related to screwing the thread plug gauge (11) into a reference thread.

7. Apparatus according to claim 3, wherein the reference curve (210) and/or a curve or a magnitude derived therefrom is compared with the signals (100) and/or a curve or a magnitude derive therefrom.

8. Apparatus according to claim 7, wherein the curve or the magnitude derived from the reference curve (210) comprises an envelope (101, 102), a threshold (110), and/or an area threshold.

9. Apparatus according to claim 3, wherein the means for evaluation of the signals (100) comprise means (51) for evaluation of the signals (100) over time.

10. Method for testing threads, comprising the following steps:
    a. arranging a thread plug gauge (11) in exchange for a tool at a tool spindle (20) of a tool machine;
    b. screwing the thread plug gauge (11) into a thread (2) previously tapped by the machine tool; and
    c. acquiring and evaluating signals (100) which relate to the screwing in of the thread plug gauge (11).

11. Method according to claim 10, wherein the signals (100) comprise at least one of the physical magnitudes current, effective power, torque and/or a path signal.

12. Method according to claim 10, furthermore comprising:
    storing a reference curve (210) of signals which are related to screwing the thread plug gauge (11) into a reference thread.

13. Method according to claim 10, wherein the reference curve (210) and/or a curve or magnitude derived therefrom is compared with the signals (100) and/or a curve or magnitude derive therefrom.

14. Method according to claim 13, wherein the curve or magnitude derived from the reference curve (210) comprises an envelope (101, 102), a threshold (110) and/or an area threshold.

15. Method according to claim 10, wherein the signals (100) are evaluated overtime.

16. Method for testing threads, comprising the following steps:
    acquiring signals (100) from one or more signal transmitters, wherein the signals are related to screwing a thread plug gauge (11) into a thread (2);
    storing a reference curve (210) of signals which are related to screwing the thread plug gauge (11) into a reference thread; and
    comparing the reference curve (210) and/or a curve or magnitude derived therefrom with the signals (100) and/or a curve or magnitude derive therefrom.

17. Method according to claim 16, wherein the signals (100) comprise at least one of the physical magnitudes current, effective power, torque and/or a path signal.

18. Method according to claim 16, wherein the signal transmitters comprise the machine tool.

19. Method according to claim 16, wherein the derived curve or magnitude comprises an envelope (101, 102), a threshold (110) and/or an area threshold.

20. Method according to claim 16, wherein the signals (100) are evaluated overtime.

* * * * *